July 1, 1924.

A. METTRAS 1,499,836

RAIL JOINT

Filed Feb. 14, 1924

Inventor
Alexander Mettras
William A. Strauch
By
Attorney

Patented July 1, 1924.

1,499,836

UNITED STATES PATENT OFFICE.

ALEXANDER METTRAS, OF DE BEQUE, COLORADO.

RAIL JOINT.

Application filed February 14, 1924. Serial No. 692,813.

*To all whom it may concern:*

Be it known that I, ALEXANDER METTRAS, citizen of the United States, residing at De Beque, in the county of Mesa and State of Colorado, have invented certain new and useful Improvements in Rail Joints, of which the following is a specification.

The present invention relates to connecting means for rails.

More particularly the invention relates to rail connectors particularly adaptable for the rapid assembling of temporary track, as for example in mining, excavating, construction and like operations where it is desirable to lay track rapidly and remove it easily, although the invention is not limited in use for temporary or removable trackage.

In the connectors commonly used, it is the practice to utilize connecting bolts and nuts together with lock washers to secure the joints. The making and breaking of such joints requires the time of tightening and loosening the nuts which are necessarily slow and tedious operations particularly when the parts become rusted and stick together.

An object of the invention is the provision of an improved rail joint or connection adapted for rapid assembling and breaking of the joints without destruction and wastage of parts.

A further object of the invention is the provision of a connector in which the necessity for tightening or loosening threaded members in making or breaking the connection is avoided.

Still other objects of the invention are the provision of more efficient connectors and such as will be attained by the utilization of the principles and structures set forth hereinafter.

Referring to the drawings—

Figure 1:
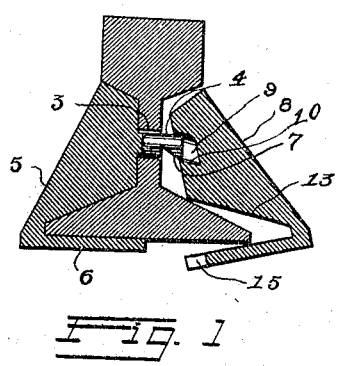
Fig. 1 is a sectional view showing the parts in position for assembly, or for disconnection.
Figure 2:
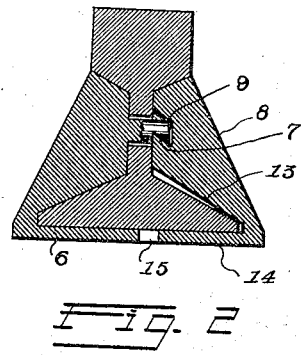
Fig. 2 is a sectional view showing the assembled relation.
Figure 3:
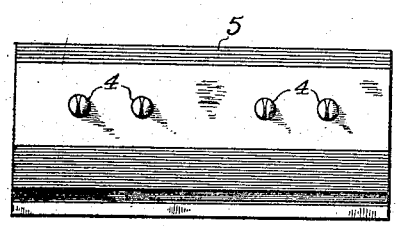
Fig. 3 is a side view of the male connector.
Figure 4:
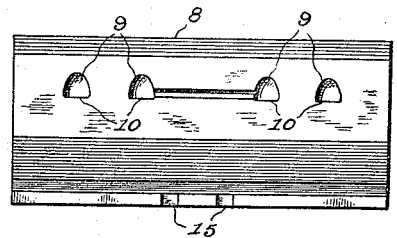
Fig. 4 is a side view of the female connector.

Rail sections 1 and 2 are placed with the ends thereof in abutment. Each rail section has a plurality of holes 3 formed therein through which projecting lugs 4 of a male connector member 5 are adapted to project. Connector 5 is shaped to fit snugly against the under side of the rail, against the rail flange and the upper side of the rail-base and has a projecting member 6 which fits under the bottom of the rail and extends approximately to the center thereof, as shown in Figures 1 and 2. It will be understood that the parts are all made of high grade tough steel or the like, and there is a lug 4 provided for each hole 3 in the rail sections, and each lug 4 has an angular notch 7 cut therein. The angle of notch 7 is preferably greater than the angle of the upper surface of the rail-base.

Figure 5:
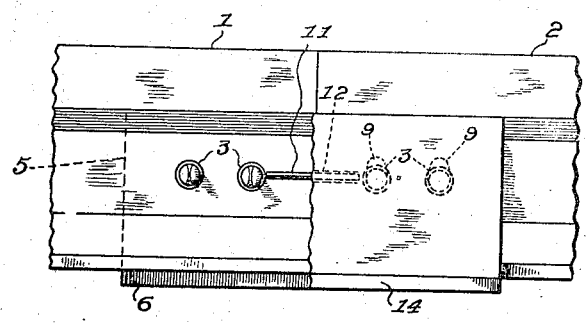
Fig. 5 is a side view showing the joint with one connector partly removed.

A female connector 8 is provided with a plurality of notches or depressions 9 formed therein in such manner that the ends thereof will just pass over the ends of lugs 7 when connectors 5 and 8 are placed in the relative positions shown in Fig. 1, and the angle of inclination of the lower plane surfaces 10 of depressions 9 is such that when connector 8 is forced into the assembled position shown in Fig. 2, the lugs 4 will preferably be forced slightly upward and will be stressed in a manner to exert a tendency to clamp connector 8 against the rail and to retain it in the assembled position, shown in Fig. 2. Connector 8 is shaped to fit under the rail head and against the rail flange as shown. To provide for suitable electrical connections or bonds 11 (Fig. 5) a suitable groove 12 is cut into connector 8.

To provide for easy and rapid disconnection of the joint the lower edge 13 of the connector 8 is cut at an angle different from the angle of the upper edge of the rail-base to give a slight clearance between the upper edge of the rail-base and the junction of the flange therewith, and depressions 9 have sufficient clearance to permit a tilting of connector 8 to force the lugs 4 upward in a manner to permit disconnection. Base member 14 of connector 8 has a plurality of notches 15 cut therein to permit the use of a special tool for disconnecting the joint, by pulling on the bottom in a manner to reverse the assembling action.

The assembling is carried out before the usual tie is placed under the joint. After the assembly is completed a tie is preferably placed underneath each joint and the usual spikes may be driven alongside the connectors to assist in retaining the joint and rails in proper assembled relation. The weight of the rolling stock on the tracks will assist the lugs 7 and spikes in preventing spreading connectors and a strong joint in this manner provided. If desired, special tie-plates may be utilized upon which the connector bases 6 and 14 may rest, but this is not essential.

To break the joint, the spikes, tie, and tie-plates if any, are removed, and by means of hammer blows and prying or preferably by means of a special tool provided for the purpose, connector 8 is tilted into the position shown in Fig. 1, and is then removed. One form of tool particularly adapted for use in assembling and breaking the present joint is disclosed in copending application, Serial Number 692,814, filed February 14, 1924.

Having described a preferred embodiment of the invention, what is desired to be secured by Letters Patent and claimed as new, is:—

1. A rail joint comprising a plurality of rail sections with the ends thereof in abutment; holes formed in the webs of said rail sections; a connector formed to fit against one side of said rail sections; projecting lugs secured to said connector having notches formed therein and extending through said holes; a coacting connector formed to fit the other side of said rail sections; and depressions in said coacting connector having surfaces adapted to fit into said notches to effect locking of said connectors against said rails; said notches having surfaces cut in angular relation with respect to the upper surface of the bases of said rail sections in a manner to compel tilting of said coacting connector to effect the assembly and the disconnection of the parts of said joint.

2. The combination as set forth in claim 1 in which said depressions are cut at an angle to cause a normal stress in said lugs when said connectors are in assembled relation.

In testimony whereof, I affix my signature.

ALEXANDER METTRAS.